(12) United States Patent
Elkatatny et al.

(10) Patent No.: US 11,780,775 B2
(45) Date of Patent: Oct. 10, 2023

(54) CEMENT COMPOSITIONS CONTAINING PHYLLOSILICATE AND METHODS OF USE

(71) Applicant: King Fahd University of Petroleum and Minerals, Dhahran (SA)

(72) Inventors: Salaheldin Elkatatny, Dhahran (SA); Ahmed Abdulhamid Mahmoud, Dhahran (SA); Abdulmalek Ahmed, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/516,625

(22) Filed: Jul. 19, 2019

(65) Prior Publication Data

US 2021/0017083 A1 Jan. 21, 2021

(51) Int. Cl.
| | |
|---|---|
| C04B 28/26 | (2006.01) |
| C04B 28/02 | (2006.01) |
| C04B 28/18 | (2006.01) |
| C04B 7/02 | (2006.01) |
| C09K 8/487 | (2006.01) |

(52) U.S. Cl.
CPC ............... *C04B 28/26* (2013.01); *C04B 7/02* (2013.01); *C04B 28/02* (2013.01); *C04B 28/184* (2013.01); *C09K 8/487* (2013.01); *C04B 2201/10* (2013.01); *C04B 2201/20* (2013.01); *C04B 2201/40* (2013.01); *C04B 2201/52* (2013.01)

(58) Field of Classification Search
CPC .......... C04B 7/02; C04B 28/02; C04B 28/26; C04B 28/184; C04B 2201/10; C04B 2201/20; C04B 2201/40; C04B 2201/52; C09K 8/467
See application file for complete search history.

(56) References Cited

U.S. PATENT DOCUMENTS

| | | | |
|---|---|---|---|
| 6,279,655 B1* | 8/2001 | Pafitis | C04B 14/106 166/294 |
| 8,586,512 B2 | 11/2013 | Roddy et al. | |
| 8,703,659 B2* | 4/2014 | Dalrymple | C09K 8/44 507/219 |
| 9,890,319 B2* | 2/2018 | Ezell | C09K 8/5045 |
| 10,065,890 B2 | 9/2018 | Rahman et al. | |
| 10,233,378 B2 | 3/2019 | Ravi et al. | |
| 2016/0160109 A1* | 6/2016 | Patil | C09K 8/467 166/293 |

FOREIGN PATENT DOCUMENTS

CN 103270132 A 8/2013

OTHER PUBLICATIONS

Laponite RDS Data Sheet, BYK Additives & Instruments. (Year: 2013).*
Elkatatny ; Development of a Homogenous Cement Slurry Using Synthetic Modified Phyllosilicate while Cementing HPHT Wells ; MDPI sustainability ; Mar. 31, 2019 ; 14 Pages.
Duarte ; Cement Slurry with Silica Flour and Calcined Clay for Cementation of Oil-Wells Subject to High Temperature ; Jan. 2015 ; 12 Pages.

* cited by examiner

*Primary Examiner* — Anthony J Green
(74) *Attorney, Agent, or Firm* — Oblon, McClelland, Maier & Neustadt, L.L.P.

(57) ABSTRACT

Cement compositions containing a hydraulic cement, a synthetic phyllosilicate (e.g. Laponite®), and silica flour. The cement compositions may optionally include other additives such as an expandable agent, a defoamer, and a fluid loss controller. Cement slurries and wellbore cements made therefrom are also specified. The inclusion of the synthetic phyllosilicate has enhanced the mechanical strength, improved the density homogeneity, as well as decreased the permeability of the wellbore cement, making it suitable for cementing oil and gas wells under high pressure and high temperature (HPHT) conditions.

16 Claims, 9 Drawing Sheets

CEMENT COMPOSITIONS CONTAINING PHYLLOSILICATE AND METHODS OF USE

STATEMENT REGARDING PRIOR DISCLOSURE BY THE INVENTORS

Aspects of this technology are described in an article "Development of a Homogenous Cement Slurry Using Synthetic Modified Phyllosilicate while Cementing HPHT Wells" published in *Sustainability*, 2019, 11(7), 1923, on Mar. 31, 2019, which is incorporated herein by reference in its entirety.

BACKGROUND OF THE INVENTION

Technical Field

The present disclosure relates to cement compositions containing a hydraulic cement, a synthetic phyllosilicate, silica flour, and cement additives, cement slurries made therefrom suitable for oil and gas wells, and methods for producing cured wellbore cements.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Oil well cement (OWC) is a cement formulation that may contain additives such as retarders, fluid loss agents, dispersants, and heavy weight materials. OWC is pumped into oil wells to fill the gap between the casing and drilled formations [Pace, R. S., McElfresh, P. M., Cobb, J. A., Smith, C. L., and Olsberg, M. A., 1984. Improved Bulk Blending Techniques for Accurate and Uniform Cement Blends. Paper SPE-13041-MS Presented at the SPE Annual Technical Conference and Exhibition, Houston, Tex., 16-19 September; Cobb, J. A., and Pace, R. S., 1985. Elements Affecting Thickening Time of a Cement Blend. Paper SPE-14195-MS Presented at the SPE Annual Technical Conference and Exhibition, Las Vegas, Nev., 22-26 September; and Gerk, R. R., Simon, J. M., Logan, J. L., Sabins, F. L., 1990. A Study of Bulk Cement Handling and Testing Procedures. Society of Petroleum Engineers]. OWC is used to achieve multiple objectives: 1) to support the weak drilled formations and casings, 2) to prevent cross-flow amongst the formations, wellbore, and layers with pressure differentials, and 3) to isolate the oil-bearing zones from water bearing layers [Adams, N., 1985. Drilling engineering: a complete well planning approach. PennWell Publishing Company, Tulsa, Okla., USA; Bourgoyne., Jr. A. T., Chenevert., M. E., Millheim, Keith, K., Young, Jr. F. S., 1986. Applied Drilling Engineering; Rabia, H., 2001. Well Engineering and Construction. Entrac Consulting; Minaev, K., Gorbenko, V., Ulyanova, O., 2014. Lightweight Cement Slurries based on vermiculite. IOP Conference Series: Earth and Environmental Science, Volume 21, conference 1; and Hossain, M., Al-Majed, A. A., 2015. Fundamentals of Sustainable Drilling Engineering. John Wiley & Sons].

A cement slurry that is pumped through the oil well is characterized by non-Newtonian yield-stress rheology and other properties such as plastic viscosity and yield point. It is important to develop cement compositions that ensure efficient displacement of other fluids (e.g. drilling mud) from the casing/formations annulus, thus achieving effective zonal isolation [Bourlon, A. J. G., Roy-Delage, S. L., & Taoutaou, S., 2017a. An Innovative Methodology to Assess Cement Blend Flowability and Proneness to Segregation—A Step Forward to Higher Quality. Society of Petroleum Engineers]. Other properties such as cement static stability, strength build up rate, and volumetric change affect the curing process from cement slurry to solid cement material. During cement placement, the slurry may lose its homogeneity because of solids segregation, which considerably affects the flowability of cement [Bourlon, A. J. G., Roy-Delage, S. L., & Taoutaou, S., 2017b. A Step Forward to Assess Cement Blend Flowability and Proneness to Segregation: Cases Histories. Society of Petroleum Engineers]. In some cases, solids segregation may result in unusable cement [Williams, J. C. 1990. Mixing and Segregation in Powders. In Principles of Powder Technology, M. J. Rhodes, ed., p. 71-90. Wiley; and Williams, J. C. 1990. The Storage and Flow of Powders. In Principles of Powder Technology, M. J. Rhodes, ed., p. 91-118. Wiley]. After solidification, cement can be characterized by its capability to withstand fracturing stress.

In view of the forgoing, one objective of the present invention is to provide a cement composition that contains a hydraulic cement, silica flour, and a synthetic phyllosilicate that includes $SiO_2$, $MgO$, and $Li_2O$. The use of the synthetic phyllosilicate improves the properties of wellbore cement in oil/gas wells subjected to high pressure and high temperature (HPHT) conditions. Synthetic phyllosilicate is mixed at various percentages with a hydraulic cement, and the beneficial impact of the synthetic phyllosilicate on the mechanical strength, rheology, permeability, and density homogeneity of the wellbore cement is demonstrated.

BRIEF SUMMARY OF THE INVENTION

According to a first aspect, the present disclosure relates to a cement composition, which has a hydraulic cement, silica flour, and a synthetic phyllosilicate comprising $SiO_2$, $MgO$, and $Li_2O$, wherein (i) a combined weight of $SiO_2$ and $MgO$ is 80-95 wt % of a total weight of the synthetic phyllosilicate, and (ii) the synthetic phyllosilicate has a weight ratio of $SiO_2$ to $MgO$ in a range of 3:2 to 7:2.

In one embodiment, a weight ratio of the hydraulic cement to the synthetic phyllosilicate is in a range of 100:1 to 1,000:1.

In one embodiment, the synthetic phyllosilicate further comprises $Na_2O$.

In one embodiment, the synthetic phyllosilicate is in the form of spherical particles with an average particle size of 10-100 nm, and a BET surface area of 300-1,000 $m^2/g$.

In one embodiment, the synthetic phyllosilicate has a bulk density of 800-1,200 $kg/m^3$.

In one embodiment, the synthetic phyllosilicate contains a hectorite clay.

In one embodiment, a weight ratio of the hydraulic cement to the silica flour is in a range of 2:1 to 5:1.

In one embodiment, the cement composition further contains at least one additive selected from the group consisting of a fluid loss controller, a defoamer, and an expandable agent.

In one embodiment, the hydraulic cement is selected from the group consisting of an API Class A Portland cement, an API Class G Portland cement, an API Class H Portland cement, and a Saudi Class G hydraulic cement.

According to a second aspect, the present disclosure relates to a wet cement slurry containing the cement composition of the first aspect and water in an amount of 40-50% by weight of the hydraulic cement.

In one embodiment, the wet cement slurry has a plastic viscosity in a range of 320-380 cP.

In one embodiment, the wet cement slurry has a yield point of 50-70 lb/100 ft$^2$.

In one embodiment, the wet cement slurry has a ten-second gel strength of 9.8-14 lb/100 ft$^2$, and a ten-minute gel strength of 26-32 lb/100 ft$^2$.

According to a third aspect, the present disclosure relates to a method of cementing a portion of a wellbore. The method involves introducing the wet cement slurry of the second aspect into the portion of the wellbore, and allowing the wet cement slurry to cure, thereby forming a wellbore cement.

In one embodiment, the wellbore has a temperature in a range of 70–300° C., and a pressure of 1-40 MPa.

In one embodiment, the wellbore is at least one selected from the group consisting of a horizontal wellbore, a vertical wellbore, and a multi-lateral wellbore.

In a further embodiment, the wellbore cement has a compressive strength of 40-55 MPa.

In a further embodiment, the wellbore cement has a gas permeability of 0.025-0.042 millidarcy (mD).

In a further embodiment, the wellbore cement has a gas permeability 25-40% less than that of a substantially identical cement not formed with the synthetic phyllosilicate.

In a further embodiment, the weight ratio of the hydraulic cement to the synthetic phyllosilicate is from 100:1 to 1,000:1, and the wellbore cement has a vertical density variation 25-99% less than that of a substantially identical cement not formed with the synthetic phyllosilicate.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
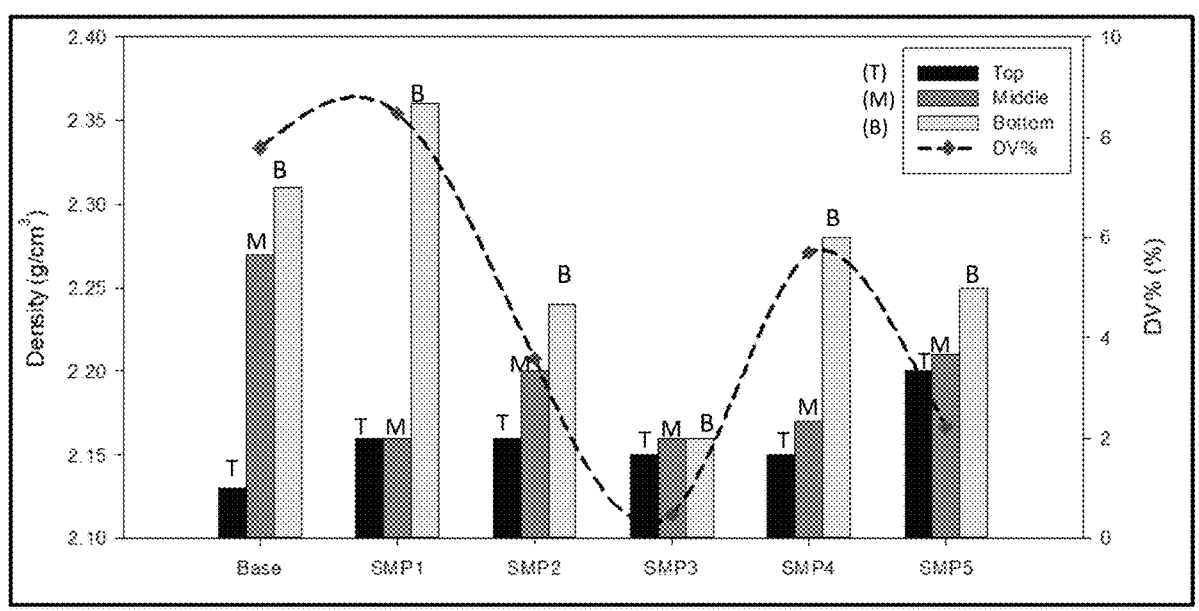
FIG. 1 is a bar graph summarizing density measurement data collected at the top, middle, and bottom of cured cement samples "Base", SMP1, SMP2, SMP3, SMP4, SMP5, as well as vertical density variation (DV %) of these samples (refer to Table 1 for cement sample composition).

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about" or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), or +/−15% of the stated value (or range of values). Within the description of this disclosure, where a numerical limit or range is stated, the endpoints are included unless stated otherwise. Also, all values and subranges within a numerical limit or range are specifically included as if explicitly written out.

According to a first aspect, the present disclosure relates to a cement composition, which contains a hydraulic cement, silica flour, and a synthetic phyllosilicate comprising $SiO_2$ and MgO. Phyllosilicate, or sheet silicate, forms parallel sheets of tetrahedral silicate where each silicate sheet contains $Si_4O_{10}$ or has a molar ratio of Si:O of 2:5. Examples of phyllosilicate include serpentine, clay minerals, mica, and chlorite. In one embodiment, the synthetic phyllosilicate of the present disclosure may be a type of clay mineral.

Clay minerals are characterized by two-dimensional sheets of corner sharing $SiO_4$ tetrahedra and/or $AlO_4$ octahedra. The sheet units have the chemical composition (Al, Si)$_3$O$_4$. Each silica tetrahedron shares 3 of its vertex oxygen atoms with other tetrahedra forming a hexagonal array in two-dimensions. The fourth vertex is not shared with another tetrahedron and all of the tetrahedra "point" in the same direction; i.e. all of the unshared vertices are on the same side of the sheet.

In clay minerals, the tetrahedral sheets are bonded to octahedral sheets formed from small cations, such as aluminum, magnesium, and lithium, and are coordinated by six oxygen atoms. Each unshared vertex from the tetrahedral sheet also forms part of one side of the octahedral sheet, but an additional oxygen atom is located above the gap in the tetrahedral sheet at the center of the six tetrahedra. This oxygen atom is bonded to a hydrogen atom forming an OH group in the clay structure. Clay minerals can be categorized depending on the way that tetrahedral and octahedral sheets are packaged into layers. If there is only one tetrahedral and one octahedral group in each layer, the clay is known as a 1:1 clay. The alternative, known as a 2:1 clay, has two tetrahedral sheets with the unshared vertex of each sheet pointing towards each other and forming each side of the octahedral sheet. In other words, a tetrahedral double layer sandwiches an octahedral layer.

Bonding between the tetrahedral and octahedral sheets may require that the tetrahedral sheet becomes corrugated or twisted, causing ditrigonal distortion to the hexagonal array, and the octahedral sheet may be flattened. This minimizes the overall bond-valence distortions of the crystallite. Depending on the composition of the tetrahedral and octahedral sheets, the layer will have no charge, or will have a net negative charge. If the layers are charged this charge is balanced by interlayer cations such as $Na^+$ or $K^+$. In each case, the interlayer may contain water. The crystal structure is formed from a stack of layers interspaced with the interlayers.

The synthetic phyllosilicate of the present disclosure may be a clay mineral similar or identical to a clay mineral of the following types: kaolin, smectite, illite, chlorite, sepiolite, attapulgite, or some other type. Kaolins include the minerals kaolinite, dickite, halloysite, and nacrite. Smectites include dioctahedral smectites such as montmorillonite, nontronite, bentonite, and beidellite as well as trioctahedral smectites such as saponite and hectorite. In general, dioctahedral smectites have an average of 2 of every 3 octahedral sites occupied by a cation, while trioctahedral smectites have approximately all 3 of every 3 octahedral sites occupied by a cation. Illites include clay-micas and illite. Chlorites include baileychlore, chamosite, clinochlore, cookeite, donbassite, gonyerite, nimite, odinite, orthochamosite, pennantite, ripidolite, and sudoite. Other 2:1 clay types exist such as sepiolite or attapulgite.

In one embodiment, the synthetic phyllosilicate may be a smectite, and may be a dioctahedral or a trioctahedral smectite, preferably a trioctahedral smectite, more preferably a hectorite clay. In at least one embodiment, the synthetic phyllosilicate is devoid of montmorillonite. In certain embodiments, the synthetic phyllosilicate contains a mixture of different trioctahedral phases such as trioctahedral kerolite, and trioctahedral stevensite in addition to or in lieu of the trioctahedral smectite.

In one embodiment, the synthetic phyllosilicate being a "hectorite clay" means that the synthetic phyllosilicate is a trioctahedral smectite with $Mg^{2+}$ and $Li^+$ occupying the octahedral sites at molar ratio similar to naturally occurring hectorite. Preferably, the phyllosilicate contains $SiO_2$ and MgO with a combined weight of $SiO_2$ and MgO comprising 80-95 wt %, preferably 82-92 wt %, more preferably 85-90 wt %, or about 87 wt % of a total weight of the synthetic phyllosilicate. In a related embodiment, the synthetic phyllosilicate has a weight ratio of $SiO_2$ to MgO in a range of 3:2 to 7:2, preferably 7:4 to 3:1, more preferably 2:1 to 5:2, or about 2.16:1. The synthetic phyllosilicate may contain $Li_2O$ in an amount of 0.3-1.8 wt %, preferably 0.5-1.5 wt %, more preferably 0.7-1 wt %, or about 0.8 wt % relative to a total weight of the synthetic phyllosilicate. The synthetic phyllosilicate may also contain $Na_2O$ in an amount of 2-5 wt %, preferably 2.2-4 wt %, more preferably 2.5-3 wt %, or about 2.8 wt % relative to a total weight of the synthetic phyllosilicate. In at least one embodiment, the synthetic phyllosilicate is a hectorite clay with a general empirical formula of $Na_{0.7}Si_8Mg_{5.5}Li_{0.3}O_{20}(OH)_4$.

In one embodiment, the synthetic phyllosilicate has a bulk density of 800-1,200 kg/m$^3$, 900-1,100 kg/m$^3$, 950-1,050 kg/m$^3$, or about 1,000 kg/m$^3$.

The Brunauer-Emmet-Teller (BET) theory (S. Brunauer, P. H. Emmett, E. Teller, *J. Am. Chem. Soc.* 1938, 60, 309-319, incorporated herein by reference) aims to explain the physical adsorption of gas molecules on a solid surface and serves as the basis for an important analysis technique for the measurement of a specific surface area of a material. Specific surface area is a property of solids which is the total surface area of a material per unit of mass, solid or bulk volume, or cross sectional area. In most embodiments, pore size (i.e., pore diameter), total pore volume, and BET surface area are measured by gas adsorption analysis, preferably $N_2$ adsorption analysis (e.g. $N_2$ adsorption isotherms). In one embodiment, the synthetic phyllosilicate has a BET surface area in a range of 300-1,000 m$^2$/g, 320-800 m$^2$/g, 340-600 m$^2$/g, 360-400 m$^2$/g, or about 370 m$^2$/g.

In one embodiment, the synthetic phyllosilicate being "synthetic" means that the synthetic phyllosilicate is manufactured by people, rather than by natural processes. It may be beneficial to use synthetic phyllosilicates rather than natural phyllosilicates because they are pure, have controllable chemical and physical properties, and are readily available.

In a preferred embodiment, the synthetic phyllosilicate of the present disclosure is in the form of spherical, or substantially spherical (e.g., oval or oblong shape) particles. Sphericity is a measure of how closely the shape approaches that of a mathematically perfect sphere, and is defined as the ratio of the surface area of a perfect sphere having the same volume as a hollow silica sphere to the surface area of the hollow silica sphere (with unity being a perfect sphere). Preferably the synthetic phyllosilicate used herein has a high sphericity, with an average sphericity of at least 0.9, preferably at least 0.92, preferably at least 0.94, preferably at least 0.96, preferably at least 0.98, preferably at least 0.99. On the contrary, natural phyllosilicates have predominantly polygonal shapes. For example, California hectorite may be square- or lath-shaped, and Wyoming bentonite is hexagon-shaped.

An average diameter (e.g., average particle size) of the particle, as used herein, and unless otherwise specifically noted, refers to the average linear distance measured from one point on the particle through the center of the particle to a point directly across from it. For a circle, an oval, an ellipse, and a multilobe, the term "diameter" refers to the greatest possible distance measured from one point on the shape through the center of the shape to a point directly across from it. For polygonal shapes, the term "diameter", as used herein, and unless otherwise specified, refers to the greatest possible distance measured from a vertex of a polygon through the center of the face to the vertex on the opposite side. In one embodiment, the synthetic phyllosilicate may be in the form of particles with an average particle size in a range of 5-100 nm, 10-75 nm, 15-50 nm, or 20-40 nm. In a related embodiment, the synthetic phyllosilicate may have an average particle size that is at least 50% smaller, at least 75% smaller, at least 80% smaller, at least 90% smaller, or at least 95% smaller than a natural phyllosilicate (e.g. natural hectorite, natural bentonite), which is extracted from the earth. However, in an alternative embodiment, a natural phyllosilicate (e.g. natural hectorite) may be used in addition to or in lieu of the synthetic phyllosilicate.

In one embodiment, the synthetic phyllosilicate of the present disclosure is Laponite®, which is a synthetic hectorite clay currently manufactured by BYK-Chemie GmbH, Wesel, Germany. Exemplary Laponite® products applicable to the present disclosure include, but are not limited to, Laponite® RD, Laponite® RDS, Laponite® 5482, Laponite® SL25, Laponite® EP, Laponite® JS, Laponite® XLG, Laponite® XLS, Laponite® XL21, and Laponite® D. In a most preferred embodiment, the synthetic phyllosilicate is Laponite® RD.

The cement composition of the present disclosure also contains silica flour. The silica flour used herein may comprise particles of crystalline silica ($SiO_2$), preferably α-quartz, having a particle size of 1-500 μm, preferably 5-250 μm, preferably 10-200 μm, preferably 20-150 μm, preferably 40-100 μm. In one embodiment, the silica flour comprises greater than 95 wt % $SiO_2$, preferably greater than 98 wt % of $SiO_2$, more preferably greater than 99 wt % $SiO_2$. In other embodiments, silica flour may be referred to as silica sand, silica powder, or quartz sand.

Non-limiting examples of silica flour include fine silica flour, silica flour, silica sand, and mixtures thereof. Fine silica flour is crystalline silica having a particle size smaller than 20 μm, preferably a particle size of 1-18 μm, 2-15 μm, or 5-10 μm. Silica flour is crystalline silica which may be produced by grinding silica sand. The particle size of silica flour is generally in the range of 20-50 μm, preferably in the range of 25-45 μm, or 30-40 μm. Silica sand is also crystalline silica and may have a particle size in the range of 80-500 μm, preferably 100-400 μm, 150-300 μm, or 200-250 μm. In an alternative embodiment, the cement composition may comprise silica in a different form, including but not limited to, fumed silica, amorphous silica, and β-quartz. An example of amorphous silica is micro-silica having a particle size of less than 1 μm.

As used herein, the term "cement composition" refers to a composition or substance with one or more constituents that are capable of binding other materials together once cured. Generally, cement composition may include a number of dry constituents chosen based on the desired ratio or class of cement to be produced. Thus, cement composition used herein refers to a dry composition before curing unless the context clearly dictates otherwise, for example, in a wet cement slurry, or in a cured cement material.

The cement composition disclosed herein also includes a cement. In one embodiment, the cement used herein may include hydraulic cement, non-hydraulic cement, or a combination thereof. In a preferred embodiment, the cement is hydraulic cement. The cement may comprise Portland cement, a basic ingredient of concrete, mortar, stucco, and/or non-specialty grout, which is present as a fine powder, and produced by heating limestone and clay materials in a kiln to form clinker, grinding the clinker, and adding small amounts of other materials. Exemplary Portland cement includes, without limitation, ordinary Portland cement (OPC) type I, type II, type III, type IV, type V, and a combination thereof (in accordance with either ASTM C 150 or European EN-197 standard). Portland cement type IA, type IIA, and/or type IIIA may also be used, which have the same composition as type I, II, and III except that an air-entraining agent is ground into the mix (also in accord with the ASTM C 150 standard). Additional cement types include hydraulic cements, Saudi Class G hydraulic cement, non-hydraulic cements, Portland fly ash cement, Portland Pozzolan cement, Portland silica fume cement, masonry cements, mortars, EMC cements, stuccos, plastic cements, expansive cements, white blended cements, Pozzolan-lime cements, slag-lime cements, supersulfated cements, calcium aluminate cements, calcium sulfoaluminate cements, geopolymer cements, Rosendale cements, polymer cement mortar, lime mortar, and/or pozzolana mortar. In one embodiment, the cement comprises a cement blend of two or more types of cement, for example, a blend comprising Portland cement and non-Portland hydraulic cement.

Hydraulic cements may be used to cement the casing within the wellbore, e.g., in the annulus between the outside surface of the casing and the surface of the wellbore. Hydraulic cements set and develop compressive strength due to the occurrence of a hydration reaction which allows them to set or cure under water. The physical properties of the set cement relate to the crystalline structure of the calcium-silicate-hydrates formed during hydration. For example, conventional Portland cements form an interlocking crystalline network of, for example, tricalcium silicate, dicalcium silicate, tetracalcium aluminum ferrite and calcium hydroxide crystals. These crystals interconnect to form an interlocking crystalline structure which provides both flexural strength and a degree of resiliency. Hydration products of Portland cements may also form crystalline or amorphous interlocking networks of the hydration products calcium silicate hydrate (CSH, or C—S—H), calcium hydroxide (CH, or Portlandite), calcium silicate (Larnite), aluminum calcium iron oxide (such as $Ca_2FeAlO_5$), and/or silicon dioxide.

The term "hydraulic cement" refers to any inorganic cement that hardens or sets due to hydration. Hydraulic cements, for instance, include Portland cements, aluminous cements, pozzolan cements, fly ash cements, and the like. Thus, for example, any of the oil well type cements of the class "A-H" as listed in the API Spec 10, (1st ed., 1982), are suitable hydraulic cements. In one or more embodiments, the hydraulic cement is selected from the group consisting of API Class A Portland cement, API Class C Portland cement, API Class G Portland cement, API Class H Portland cement, and Saudi Class G hydraulic cement. In a preferred embodiment, the hydraulic cement is Saudi Class G hydraulic cement. In one embodiment, the cement is in the dry form. If needed to set, water is typically added after the cement is mixed with other components or ingredients, for example, silica flour, the synthetic phyllosilicate, and it is then ready to be hardened or set.

In one or more embodiments, a weight ratio of the hydraulic cement to the silica flour present in the cement composition is in a range of 2:1 to 5:1, preferably 2.2:1 to 4:1, preferably 2.5:1 to 3.5:1, preferably 2.7:1 to 3:1. In a most preferred embodiment, the weight ratio of the hydraulic cement to the silica flour is in a range of 2.5:1 to 3.5:1, 2.7:1 to 3.1:1, or about 2.86:1. However, in certain embodiments, the weight ratio of the hydraulic cement to the silica flour is less than 2:1 or greater than 6:1. In a related embodiment, the silica flour is present in the cement composition in an amount ranging from 16% by weight of cement (BWOC) to 50% BWOC, preferably from 20% BWOC to 45% BWOC, preferably from 25% BWOC to 40% BWOC, preferably from 30% BWOC to 37% BWOC, or about 35% BWOC.

In one or more embodiments, a weight ratio of the hydraulic cement to the synthetic phyllosilicate present in the cement composition is in a range of 100:1 to 1,000:1, preferably 200:1 to 900:1, preferably 300:1 to 800:1, preferably 400:1 to 700:1, preferably 500:1 to 600:1. In a most preferred embodiment, the weight ratio of the hydraulic cement to the synthetic phyllosilicate is in a range of 200:1 to 500:1, 250:1 to 400:1, 300:1 to 350:1, or about 333:1. In a related embodiment, the synthetic phyllosilicate is present in the cement composition in an amount ranging from 0.1% BWOC to 1% BWOC, preferably from 0.15% BWOC to 0.8% BWOC, preferably from 0.2% BWOC to 0.6% BWOC, preferably from 0.25% BWOC to 0.5% BWOC, preferably from 0.28% BWOC to 0.4% BWOC, or about 0.3% BWOC.

In one embodiment, the cement composition further comprises a fluid loss controller. Fluid loss controllers, fluid loss additives, or fluid loss control agents, are used to control the rate at which a cement slurry loses water and to maintain it within the acceptable industry standards. Controlling fluid loss rate is an important issue to be considered when cementing across permeable formations, where it could be damaged by the cement slurry filtrate. Exemplary fluid loss controllers include, but are not limited to, guar gums and derivatives, welan gum, xanthan gum, poly(ethyleneimine), AMPS polymer (i.e. poly(2-acrylamido-2-methyl-1-propanesulfonic acid), cellulose and derivatives such as carboxymethyl hydroxyethyl cellulose, carboxymethyl cellulose, and hydroxyethyl cellulose, and polystyrene sulfonate. In one embodiment, the fluid loss controller is Halliburton's HALAD®-344 fluid-loss additive. When a fluid loss controller is present in the cement composition, a weight ratio of the hydraulic cement to the fluid loss controller is in a range of 60:1 to 275:1, preferably 80:1 to 200:1, more preferably 100:1 to 150:1. In a related embodiment, the fluid loss controller is present in the cement composition in an amount ranging from 0.35% BWOC to 2% BWOC, preferably 0.4% BWOC to 1.5% BWOC, preferably 0.5% BWOC to 1% BWOC, preferably 0.6% BWOC to 0.9% BWOC, or about 0.75% BWOC.

In one embodiment, the cement composition further comprises a defoamer. Defoamers are anti-foaming agents used to minimize air entrainment (e.g. frothing, foaming) that often occurs during cement slurry mixing processes. The entrapped air in the cement slurry may damage pumps in the field, and may also cause incorrect density of cement slurry. Exemplary defoamers include, but are not limited to, silicone based defoamers, polyethylene glycol and polypropylene glycol copolymers based defoamers, and oil-based defoamers, alkyl polyacrylates and polyether polymer. In one embodiment, the defoamer is Halliburton's D-Air® 4000L defoamer. When a defoamer is present in the cement composition, a weight ratio of the hydraulic cement to the defoamer is in a range of $10^7$:1 to $10^9$:1, preferably $5 \times 10^7$:1 to $5 \times 10^8$:1, more preferably $10^8$:1 to $3 \times 10^8$:1. In a related embodiment, the defoamer is present in the cement composition in an amount ranging from $(10^{-8})$% BWOC to $(10^{-6})$% BWOC, preferably from $(5 \times 10^{-8})$% BWOC to $(8 \times 10^{-7})$% BWOC, preferably from $(10^{-7})$% BWOC to $(6 \times 10^{-7})$% BWOC, preferably from $(2 \times 10^{-7})$% BWOC to $(5 \times 10^{-7})$% BWOC, or about $(4.7 \times 10^{-7})$% BWOC.

In one embodiment, the cement composition further comprises an expandable agent. Conventional cement may shrink and cause cracks during the curing steps. Expandable agents, or expanding agent, may be used to promote cement bonding capability and help maintain concrete integrity. Exemplary expandable agents include, but are not limited to, sulphoaluminates such as UEA, calcium oxide, and other expansion admixtures. In a preferred embodiment, the expandable agent is Halliburton's Microbond HT® Expanding Additive. When an expandable agent is present in the cement composition, a weight ratio of the hydraulic cement to the expandable agent is in a range of 50:1 to 200:1, preferably 80:1 to 150:1, more preferably 90:1 to 120:1. In a related embodiment, the expandable agent is present in the cement composition in an amount ranging from 0.4% BWOC to 2% BWOC, preferably 0.6% BWOC to 1.8% BWOC, preferably 0.7% BWOC to 1.5% BWOC, preferably 0.9% BWOC to 1.1% BWOC, or about 1% BWOC.

In at least one embodiment, the cement composition consists essentially of the hydraulic cement, the synthetic phyllosilicate, the silica flour, the defoamer, the fluid loss controller, and the expandable agent. Preferably, weight ratios of the hydraulic cement to each of the other components (i.e. the synthetic phyllosilicate, the silica flour, the defoamer, the fluid loss controller, and the expandable agent) are the same as previously described.

According to another aspect, the present disclosure relates to a wet cement slurry containing water and the cement composition disclosed herein in any of its embodiments. The water may be potable water, tap water, freshwater or seawater, and may be taken from a natural source, such as an aquifer, lake, or ocean, and may be filtered to remove large solids before using. A brine, which is an aqueous mixture of one or more soluble salts (e.g. sodium chloride, potassium chloride, calcium chloride, calcium bromide, sodium bromide, potassium bromide, zinc bromide), may be used as water. Seawater or water from a salt lake may be considered a brine.

In one or more embodiments, a weight ratio of the hydraulic cement to the water is in a range of 1:1 to 4:1, preferably 1.5:1 to 3.5:1, preferably 1.8:1 to 3:1, preferably 2:1 to 2.5:1, or about 2.3:1. In related embodiments, the water may be present in the wet cement slurry in an amount of 20-55 wt % by weight of the hydraulic cement, preferably 30-50 wt %, more preferably 40-48 wt %, or about 44 wt % by weight of the hydraulic cement. In general, the amount of water used in the wet cement slurry depends upon the type of hydraulic cement selected and the job conditions at hand. Thus, in other embodiments, the water may be present in the wet cement slurry in an amount of less than 20 wt % or greater than 55 wt % by weight of the hydraulic cement. The amount of water used may vary over a wide range, depending upon factors such as the chemical identity of the cement and the required consistency of the wet cement slurry.

As used herein, the term "gel strength" refers to the shear stress measured at a low shear rate after a cement slurry has set quiescently for a set period of time. According to standard API procedures, the gel strength is measured after setting for 10 seconds and 10 minutes, although measurements at longer time intervals can also be made such as, for example, 30 minutes or 16 hours. In one embodiment, the wet cement slurry has a ten-second gel strength of 9.8 to 15 $lb_f/100$ $ft^2$, preferably 10 to 13 $lb_f/100$ $ft^2$, more preferably 10.4 to 11 $lb_f/100$ $ft^2$, or about 10.6 $lb_f/100$ $ft^2$, and a ten-minute gel strength of 26 to 35 $lb_f/100$ $ft^2$, preferably 27 to 32 $lb_f/100$ $ft^2$, more preferably 28 to 30 $lb_f/100$ $ft^2$, or about 28.4 lb/100 ft². These gel strengths may be measured at a temperature of 60 to 150° F., 70 to 100° F., or 75 to 90° F.

As used herein, the term "yield point" (YP) refers to a parameter of the Bingham plastic model, where yield point refers to the yield stress extrapolated to a shear rate of zero. In one embodiment, the wet cement slurry has a yield point in a range of 50 to 75 lb/100 ft², preferably 55 to 70 lb/100 ft², more preferably 60 to 65 lb/100 ft², or about 61 lb/100 ft². The yield points may be measured at a temperature of 60 to 150° F., 70 to 100° F., or 75 to 90° F.

"Plastic viscosity" (PV) is another parameter of the Bingham plastic model, which represents the slope of the shear stress/shear rate line above the yield point. In one embodiment, the wet cement slurry has a plastic viscosity in a range of 320 to 380 cp, preferably 340 to 375 cp, more preferably 360 to 370 cp, or about 367 cp. The plastic viscosity may be measured at a temperature of 60 to 150° F., 70 to 100° F., or 75 to 90° F.

The phyllosilicate may be thixotropic, meaning that its viscosity quickly drops when exposed to an increased level of sheer. The phyllosilicate may also impart viscosity and increase stability of the wet cement slurry. Accordingly, the synthetic phyllosilicate may modify rheology properties such as yield point and gel strength of the wet cement slurry.

Figure 3:
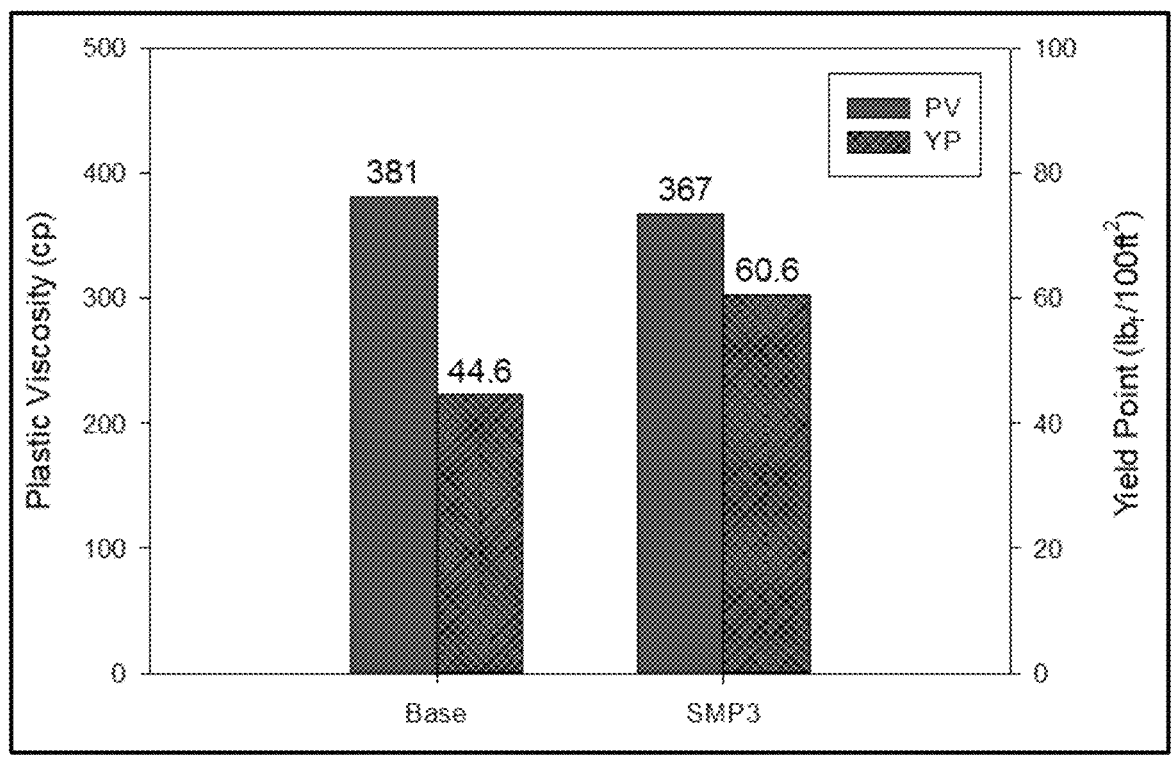
FIG. 3 is a bar graph showing plastic viscosity and yield point of wet cement samples "Base" and SMP3.
Figure 4:
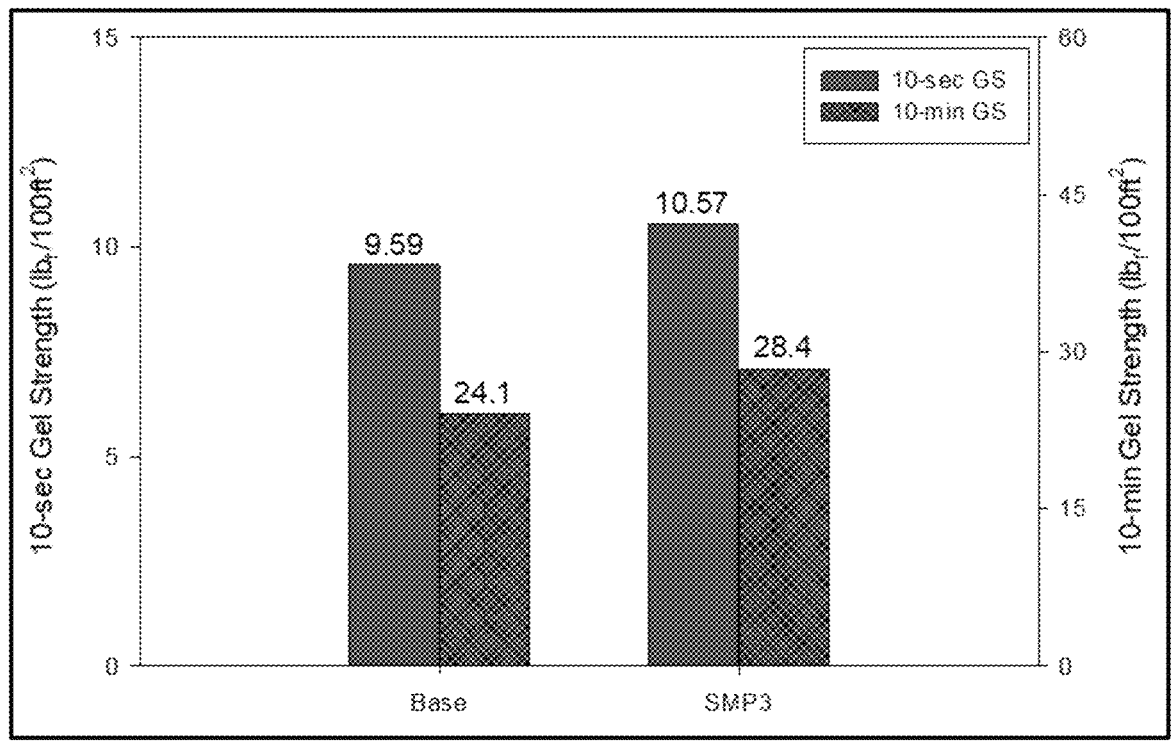
FIG. 4 is a bar graph showing ten-second gel strength and ten-minute gel strength of wet cement samples "Base" and SMP3.

In one embodiment, the wet cement slurry has a ten-second gel strength 5-20% greater than that of a substantially identical cement slurry not formed with the synthetic phyllosilicate, preferably 8-15% greater, preferably 10-12% greater than that of a substantially identical cement slurry not formed with the synthetic phyllosilicate (see FIG. 4). In another embodiment, the wet cement slurry has a ten-minute gel strength 10-30% greater than that of a substantially identical cement slurry not formed with the synthetic phyllosilicate, preferably 12-20% greater, preferably 15-18% greater than that of a substantially identical cement slurry not formed with the synthetic phyllosilicate (see FIG. 4). In another embodiment, the wet cement slurry has a yield point 18-40% greater than that of a substantially identical cement slurry not formed with the synthetic phyllosilicate, preferably 20-30% greater, preferably 25-28% greater than that of a substantially identical cement slurry not formed with the synthetic phyllosilicate (see FIG. 3).

The wet cement slurry may be prepared by any suitable means known in the art. In some embodiments, the wet cement slurry may be prepared at a well site or at an offsite location. Once prepared, the wet cement slurry may be placed in a tank, bin, or other container for storage and/or transport to the site to use. In other embodiments, the wet cement slurry may be prepared on-site, for example, using continuous mixing, on-the-fly mixing, or real-time mixing methods. In some embodiments, the wet cement slurry may be made by a specific order of adding and mixing components. For instance, the synthetic phyllosilicate may be mixed with water first for a period of 1-10 minutes, 2-8 minutes, or 3-6 minutes. After a thorough mixing, other components such as the hydraulic cement, the silica flour, the defoamer, the fluid loss controller, and the expandable agent may be slowly poured into the concrete mixer, and the wet cement mixture is further mixed for a time period of 1-30 minutes, 3-20 minutes, or 5-10 minutes, thereby forming the wet cement slurry.

According to a further aspect, the present disclosure relates to a method of cementing a portion of a wellbore. The method involves introducing the wet cement slurry of the second aspect into the portion of the wellbore, and allowing the wet cement slurry to cure, thereby forming a wellbore cement.

The wet cement slurry containing the cement composition may be used in wellbore cementing operations such as primary cementing where strings of pipe (e.g. casings and liners) are cemented in wellbores. In one embodiment, the wet cement slurry is introduced into and cured within an annulus existing between a pipe and a formation of a wellbore, thus producing a cured cement material (i.e. wellbore cement) between the pipe and the formation of the wellbore. The wellbore cement may physically support and position the pipe within the wellbore and prevent undesirable migration of fluids between formations of the wellbore.

In one or more embodiments, the wellbore is at least one selected from the group consisting of a horizontal wellbore, a vertical wellbore, and a multi-lateral wellbore. As used here, a "vertical wellbore" is a wellbore that has a vertical section, which is substantially perpendicular to a surface of the ground. As used here, a "horizontal wellbore" refers to a wellbore that has a vertical section and a horizontal lateral section with an inclination angle (an angle between the vertical section and the horizontal lateral section) of at least 70°, or at least 80°, or in a range of 85° to 90°. The horizontal wellbore may enhance a reservoir performance due to an increased reservoir contact provided by the horizontal lateral section. As used here, a "multi-lateral wellbore" refers to a wellbore that has a main/central borehole and a plurality of laterals extend outwardly therefrom.

The method of the present disclosure is applicable to HPHT (high-pressure high-temperature) wellbores. In one or more embodiments, the wellbore has a temperature in in a range of 25-400° C., preferably 50-350° C., preferably 75-300° C., preferably 95-250° C., preferably 100-200° C., preferably 125-175° C., preferably 140-160° C. In a related embodiment, the wellbore has a pressure in a range of 0.5-40 MPa, preferably 1-35 MPa, preferably 2-30 MPa, preferably 5-25 MPa, preferably 8-20 MPa, preferably 10-18 MPa, preferably 12-15 MPa. However, the present method may be applicable to wellbores having a temperature of less than 25° C. or greater than 400° C., or a pressure of less than 0.5 MPa or greater than 40 MPa.

As defined herein, compressive strength is the capacity of a material or structure to withstand compressive loads, as opposed to tensile strength, which is the capacity of a material or structure to withstand tensile loads. In one or more embodiments, the wellbore cement described herein has a compressive strength of 40-55 MPa, preferably 41-50 MPa, preferably 43-48 MPa, preferably 44-47 MPa, preferably 45-46 MPa. In some embodiments, the compressive strength is determined after curing the wet cement slurry for 2-48 hours, 12-36 hours, or about 24 hours.

In one embodiment, the wellbore cement described herein has a gas permeability of 0.025-0.042 millidarcy (mD), preferably 0.03-0.04 mD, more preferably 0.035-0.038 mD. The addition of synthetic phyllosilicate to a wet cement slurry may decrease the porosity and permeability of a resulting cured wellbore cement. In one embodiment, the wellbore cement derived from a wet cement slurry with a weight ratio of the hydraulic cement to the synthetic phyllosilicate less than 750:1, preferably less than 500:1, preferably less than 400:1, or about 333:1 has a gas permeability 25-50% less than that of a substantially identical cement not formed with the synthetic phyllosilicate, preferably 28-40% less, preferably 30-38% less, preferably 32-35% less than that of a substantially identical cement not formed with the synthetic phyllosilicate (see FIG. 5).

The static stability of a cement slurry is an important parameter as it ensures vertical homogeneity in terms of density variation between the top and bottom of a cement matrix. The static stability describes the ability of a cement slurry to maintain a homogeneous density while at rest. Pumping is stopped once a cement slurry reaches the required height in an annulus. Solid particles of the cement slurry tend to settle down, which may cause heterogeneous pressure gradient in the annulus. Under conventional conditions, the density and pressure gradient at the top of the cement formation are the lowest, which may cause fluids flow from formation into the wellbore. If the formation fluid is gas, gas channeling through the unsolidified cement may persist even after cement solidification. The large density and pressure gradient at the bottom may lead to formation fracturing especially within weak zones [Lavrov, A., and Torsæter, M., 2016. Physics and Mechanics of Primary Well Cementing, Chapter two. SpringerBriefs in Petroleum Geoscience & Engineering]. Free water accumulation at the top of the cement column caused by slurry segregation occurs often [Nelson, E. B., Guillot, D., 2006. Well cementing. Schlumberger], which leads to shorter cement column height than expected. Suspensions of solids in non-vertical columns are known to settle faster than suspensions in vertical ones. This effect is driven by gravity and impeded by fluid rheology, particularly non-Newtonian and time dependent rheology. Therefore, solids segregation cause inefficient cementing job at the upper part of cemented annulus, especially in horizontal wells [Bassett, J., Watters, J., Combs, N. K., & Nikolaou, M., 2013. Lowering Drilling Cost, Improving Operational Safety, and Reducing Environmental Impact through Zonal Isolation Improvements for Horizontal Wells Drilled in the Marcellus Shale. Paper URTEC-1582346-MS Presented at the SPE/AAPG/SEG Unconventional Resources Technology Conference, Denver, Colo., USA, 12-14 August].

As discussed in Example 3, "vertical density variation" is the ratio of the difference between the top and bottom densities relative to the bottom density, each of the same volume of the wellbore cement and following a certain time period of curing. A vertical density variation of exactly zero refers to no difference in top and bottom densities (for both vertical and non-vertical columns), and thus no solid segregation occurs.

In one embodiment, the vertical density variation may be measured directly from a column of wellbore cement having a length of about 4 inches. The top density may be measured from the top surface of the column to about 0.5 inch below the top surface, and the bottom density may be measured from the bottom surface of the column to about 0.5 inch from the bottom surface. The vertical density variation of wellbore cement may also be evaluated using a computerized tomography (CT) scan.

In one embodiment, the weight ratio of the hydraulic cement to the synthetic phyllosilicate is from 100:1 to 1,000:1, preferably from 150:1 to 500:1, more preferably from 200:1 to 400:1, or about 333:1, the wellbore cement has a vertical density variation ranging from 0.1-6%, preferably 0.5-4%, more preferably 1-2% (see FIG. 1).

In one embodiment, the weight ratio of the hydraulic cement to the synthetic phyllosilicate is from 100:1 to 1,000:1, preferably from 150:1 to 500:1, more preferably from 200:1 to 400:1, or about 333:1, the wellbore cement has a vertical density variation 25-99% less than that of a substantially identical cement not formed with the synthetic phyllosilicate, preferably 30-95% less, preferably 40-90% less, preferably 50-80%, preferably 60-70% less than that of a substantially identical cement not formed with the synthetic phyllosilicate (see FIGS. 1 and 2A-F).

The examples below are intended to further illustrate protocols for preparing, characterizing the cement compositions, and uses thereof, and are not intended to limit the scope of the claims.

Example 1

Materials

Seven cement slurries considered in this work were prepared using class G oil well cement, deionized water, dispersion agent, silica flour, defoamer, and fluid loss controller. The only difference between the seven cement formulations is the type and concentration of the dispersion agent while all other additives maintained the same composition and concentration in all seven slurries. Two dispersion agents were considered in this work, a commercial dispersant provided by a service company and an synthetic modified phyllosilicate (SMP), which was Laponite® RD (BYK-Chemie GmbH) with a specific gravity of about 1.

As shown in Table 1, the first formulation considered was the base slurry (i.e. sample "Base") which had no dispersion agent present. The second formulation contained 0.25% by weight of cement (BWOC) of a commercially available dispersion agent which was provided by a service company. The slurries SMP1, SMP2, SMP3, SMP4, and SMP5 contained 0.1, 0.2, 0.3, 0.4, and 0.5% BWOC of SMP which was used as a dispersion agent to prevent solids segregation for the cement slurry. Table 1 summarizes the composition of the seven cement slurries considered in this study.

TABLE 1

Cement slurries compositions

| Slurries | Cement | Water | Dispersion Agent | Silica Flour | Defoamer | Expandable Agent | Fluid Loss Controller |
|---|---|---|---|---|---|---|---|
| Base | 600 | 44 | 0 | 35 | 4.7E−07 | 1 | 0.75 |
| ComD | 600 | 44 | 0.25* | 35 | 4.7E−07 | 1 | 0.75 |
| SMP1 | 600 | 44 | 0.1 | 35 | 4.7E−07 | 1 | 0.75 |
| SMP2 | 600 | 44 | 0.2 | 35 | 4.7E−07 | 1 | 0.75 |
| SMP3 | 600 | 44 | 0.3 | 35 | 4.7E−07 | 1 | 0.75 |
| SMP4 | 600 | 44 | 0.4 | 35 | 4.7E−07 | 1 | 0.75 |
| SMP5 | 600 | 44 | 0.5 | 35 | 4.7E−07 | 1 | 0.75 |

Cement in grams and all other additives are in BWOC
*the dispersion agent used to prepare sample ComD is different than the dispersion agent considered in the other samples. This dispersion agent is CFR-3 ® Cement Friction Reducer provided by Halliburton service company, which is a commercially available dispersant used in oil industry.

Example 2

Methods: General

Cement slurries with the compositions specified in Table 1 were prepared according to the American Petroleum institute (API) procedure [API, 1991. Worldwide Cementing Practices, API, Dallas, Tex., USA, incorporated herein by reference in its entirety]. After preparation, the slurries were poured into different molds depending the targeted tests, then cured at 140° C. and 3000 psi for 24 hours using a high-pressure high-temperature (HPHT) curing chamber. After curing, the effect of dispersion agent in the density variation in vertical direction along the sample length, the cement slurry rheology, the unconfined compressive strength, and the permeability of the samples were tested. The procedures followed in every test are summarized in the following sections.

Example 3

Methods: Density Variation

Different techniques were used to evaluate the density variation. The samples for this purpose were prepared using molds of 1.5 inch in diameter and 4 inches in length, while the curing of all molds was performed vertically to compare the variations in the density from the top to the bottom of samples. The vertical density variation along the length of these cylindrical samples was evaluated through two different techniques including (i) CT scan and (ii) direct density measurement. The direct density measurements were conducted in three different positions of the cylindrical samples (e.g. the bottom, middle, and top) obtained by cutting three small cement cylinders of 1.5 inch in diameter and 0.5 inch in length out at the bottom, middle, and top of the cured cylinders.

Example 4

Measurements
Rheology
The effect of the SMP dispersant on the cement rheological parameter was evaluated. The gel strength (GS), yield point (YP), and plastic viscosity (PV) were evaluated for all the cement slurries in Table 1.
Compressive Strength
Cubical molds of 2×2×2 inches$^3$ were used for compressive strength testing. The compressive strength of each cement sample was calculated based on the average unconfined compressive strength of three cement cubes of the same slurry which were tested through the crushing test.
Permeability
The permeability of cement samples was measured on cylindrical samples of 1.5 inches in diameter and 0.5 inches in length. The permeability was measured using nitrogen as the measuring fluid.

Example 5

Results and Discussions: Overview
Firstly, the effect of the SMP on the density variation, rheology, and permeability of the cement samples will be studied and compared with the base cement slurry formulation and the optimum SMP concentration will be determined. In addition, the performance of the cement slurry prepared with the optimum SMP concentration will be compared with the cement slurry prepared using a commercial dispersant currently in use in oil industry. A discussion of the expected additional cost to prepare one barrel of cement using the SMP will be provided.

Example 6

Density Variation
The vertical density variation along the length of the cement samples was examined using both the direct density measurement and CT scan technique. FIG. 1 summarizes the density variation among the top, middle, and bottom of different cement samples under study determined using direct density measurement. This figure also compares the density variation percentage (DV %) between the top and bottom of all samples calculated using Eq.1:

$$DV\ \% = \frac{(\text{Density at top} - \text{Density at bottom})}{\text{Density at bottom}} \times 100 \quad \text{Eq. 1}$$

As indicated in FIG. 1, sample "Base" had a considerable density variation vertically along its length with a density at bottom of 2.31 g/cm$^3$, at middle of 2.27 g/cm$^3$, and at top of 2.13 g/cm$^3$. The density at the top of sample "Base" was 7.79% less than the density at bottom. Sample SMP1 with 0.1% BWOC of the SMP had a density variation of 8.47% between the top and bottom. Incorporating≥0.2% BWOC of SMP into the cement formulation reduced the vertical density variation of the solidified cement matrix. For example, sample SMP2 had a density variation of 3.57% along its length from top to bottom. The density variation between top and bottom of sample SMP3 was only 0.46%, which was the lowest among all other samples with densities of 2.16, 2.16, and 2.15 g/cm$^3$ at bottom, middle, and top of sample SMP3. Samples SMP4 and SMP5 had density variations of 5.70% and 2.22%, respectively.

CT scan technique was also used to compare the change in density of all samples under study. The CT scan images recorded at different positions through the cylindrical samples from the top to the bottom of the samples are shown in FIGS. 2A-F. The density variation is indicated by different colors: the yellow regions have the highest density, and the green regions have a second highest density, followed by the orange and red regions, while the blue regions are the regions with the lowest density. For the samples where the CT images at different position in the sample contain a broad color spectrum indicating large density variations, while the samples with a slim color spectrum indicating small density difference at different positions in the sample.

Figure 2A:
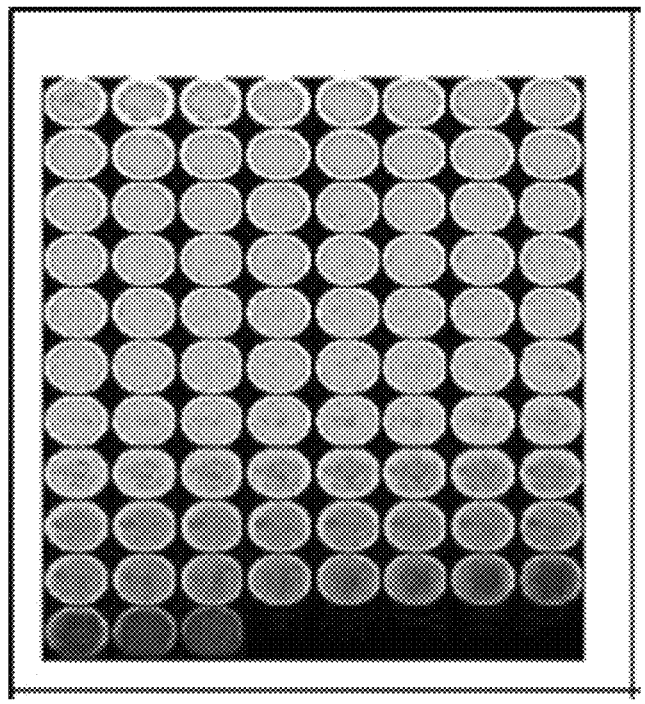
FIG. 2A shows vertical density mapping along the length of a cured cement sample "Base" measured by CT scan.
Figure 2B:
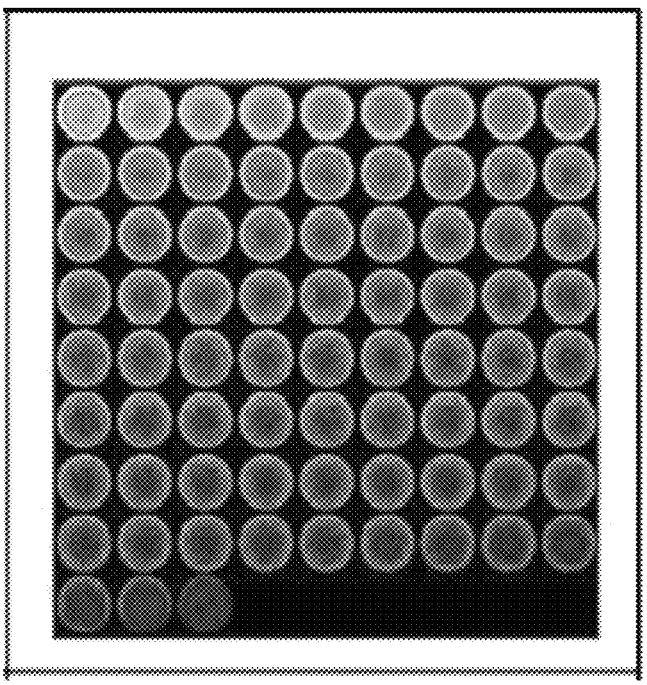
FIG. 2B shows vertical density mapping along the length of a cured cement sample "SMP1" measured by CT scan.
Figure 2C:
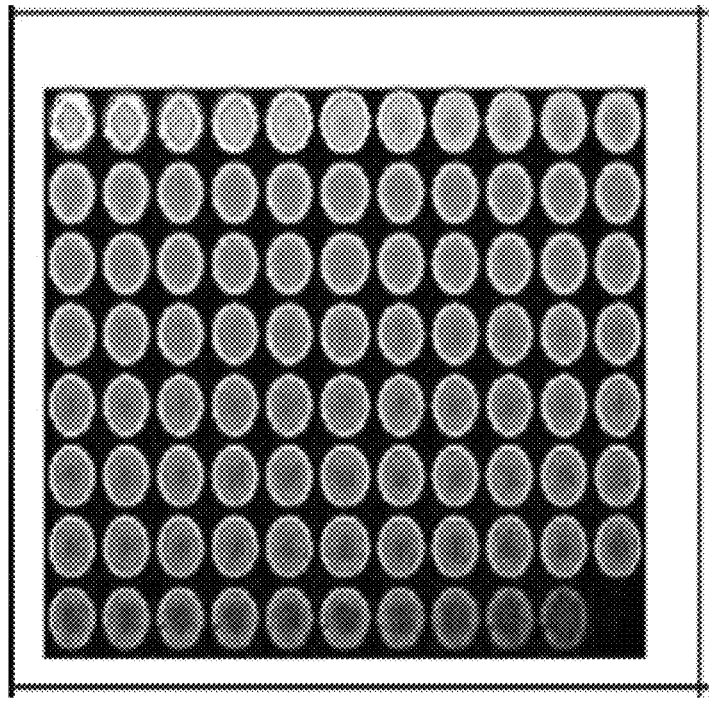
FIG. 2C shows vertical density mapping along the length of a cured cement sample "SMP2" measured by CT scan.
Figure 2D:
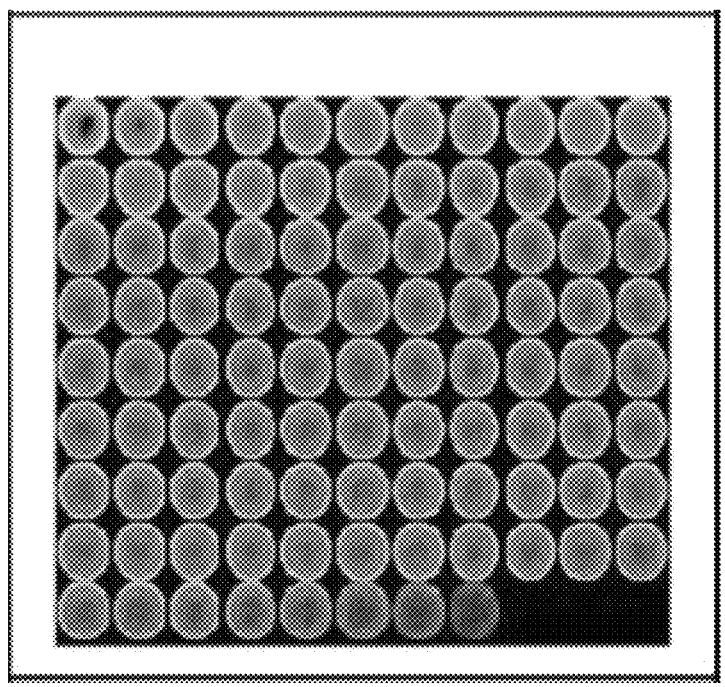
FIG. 2D shows vertical density mapping along the length of a cured cement sample "SMP3" measured by CT scan.
Figure 2E:
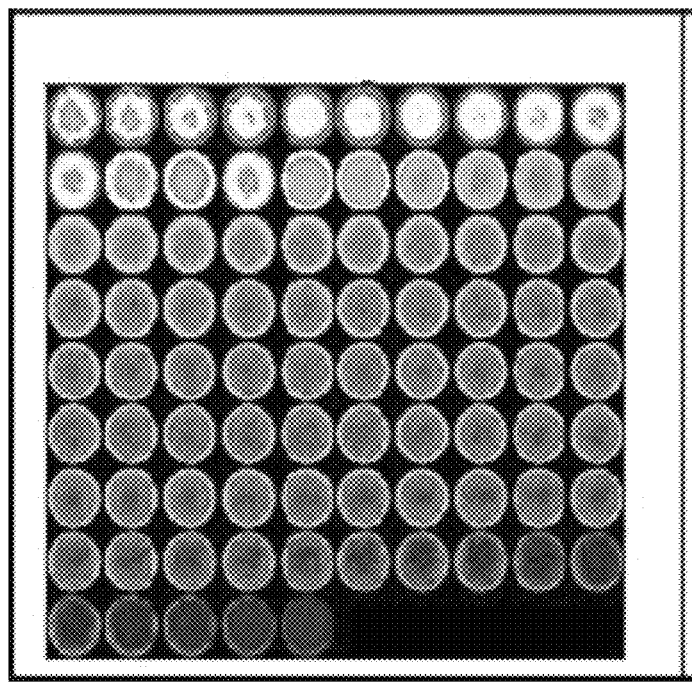
FIG. 2E shows vertical density mapping along the length of a cured cement sample "SMP4" measured by CT scan.
Figure 2F:
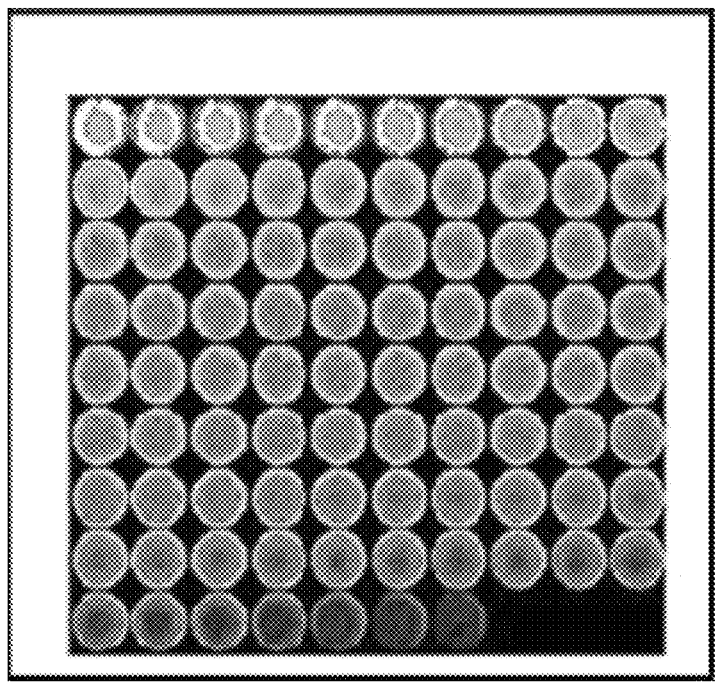
FIG. 2F shows vertical density mapping along the length of a cured cement sample "SMP5" measured by CT scan.

For the sample "Base", the slices at top are almost entirely colored blue, indicating a very low density. The color changed to almost red for the slices in the middle and to a mixed orange and yellow color at bottom as shown in FIG. 2A. Accordingly, for this "Base" sample, the CT image had a wide range of colors, indicating the significant difference in the density along the vertical direction of the sample. As shown in FIGS. 2B and 2C, similar variations in the slices colors were observed for samples SMP1 and SMP2, which had 0.1% and 0.2% BWOC of SMP, respectively. Sample SMP3 had the smallest color variation for the slices as indicated in FIG. 2D, where all slices along the sample had almost the same color, indicating that there was no obvious vertical density variation along the length of sample SMP3. The density variations in samples SMP4 and SMP5 were relatively large as demonstrated by the wide ranges of different colors in different slices of these samples. Specifically, the colors changed from blue at top to red in the middle and yellow at bottom for samples SMP4 and SMP5, as shown in FIGS. 2E and 2F.

The above results indicated that 0.3% BWOC of SMP was an optimum concentration to prevent the solids segregation. So, in the following sections the effect of using 0.3% BWOC of SMP on the rheological parameters, compressive strength, and permeability of the cement will be studied.

Example 7

Effect on Rheological Parameters
The effect of the SMP on the rheological characteristics of cement slurry was evaluated. As shown in FIG. 3, the "Base" cement had a plastic point (PV) and a yield point (YP) of 381 cP and 44.6 lb$_f$/100 ft$^2$, respectively. Incorporating 0.3%

BWOC of SMP into sample SMP3 did not affected the PV compared with the base slurry while it considerably increased the YP by 26.4% to 60.644 lb$_f$/100 ft$^2$ compared with the base slurry. An increased YP of the slurry is crucial to improve the carrying capacity of the cement slurry. In this case, it explains the greater ability of the SMP3 slurry to prevent solids segregation as compared with the base sample addressed in the previous sections.

FIG. 4 compares the 10-sec and 10-min gel strengths of samples "Base" and SMP3. The 10-sec and 10-min gel strengths of the base slurry (Base) were 9.59 and 24.1 lb$_f$/100 ft$^2$, respectively. Addition of 0.3% BWOC of SMP into the cement slurry increased both 10-sec and 10-min gel strengths slightly to 10.57 and 28.38 lb$_f$/100 ft$^2$, respectively.

Example 8

Effect on the Permeability

Figure 5:
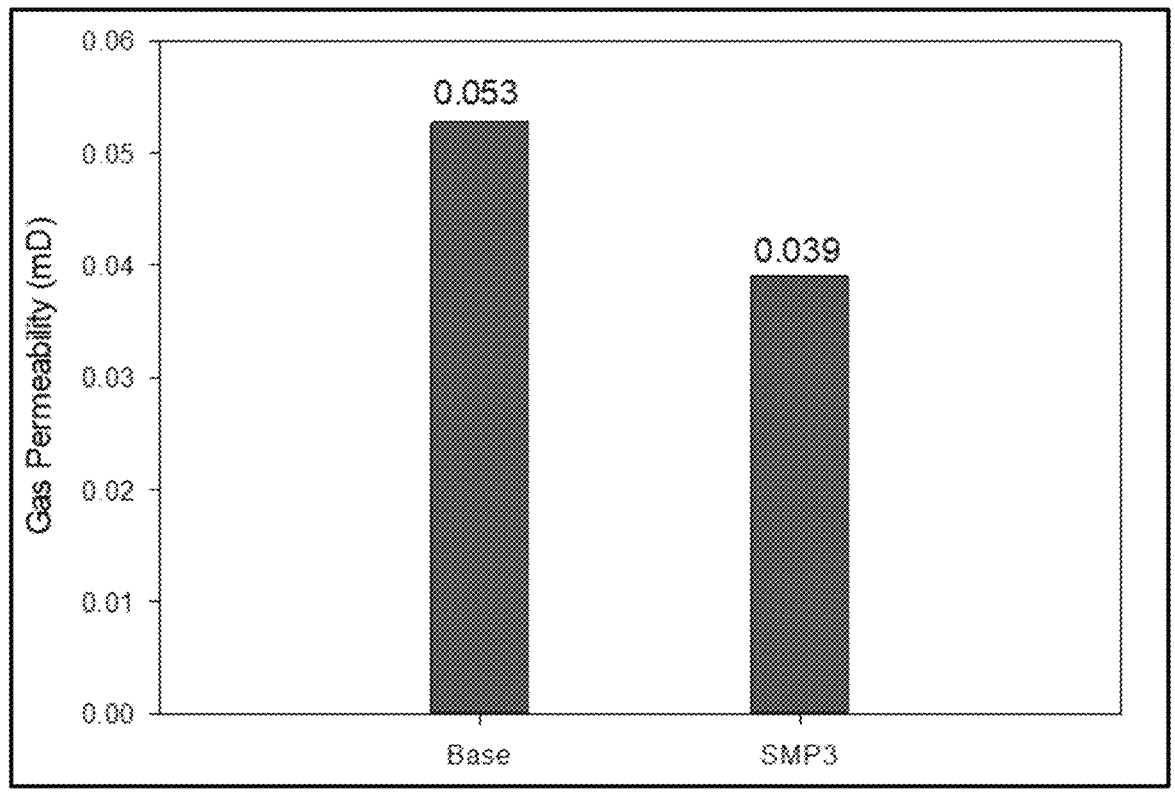
FIG. 5 is a bar graph showing gas permeability of cured cement samples "Base" and SMP3.

FIG. 5 compares the permeability of cement samples "Base" and SMP3. The permeability of sample "Base", which contained no SMP, was 0.053 mD. Sample SMP3 had a permeability of 0.039 mD, which was 26.4% less than the permeability of the base cement.

Example 9

Comparison with Samples Having a Commercial Dispersant

Figure 6:
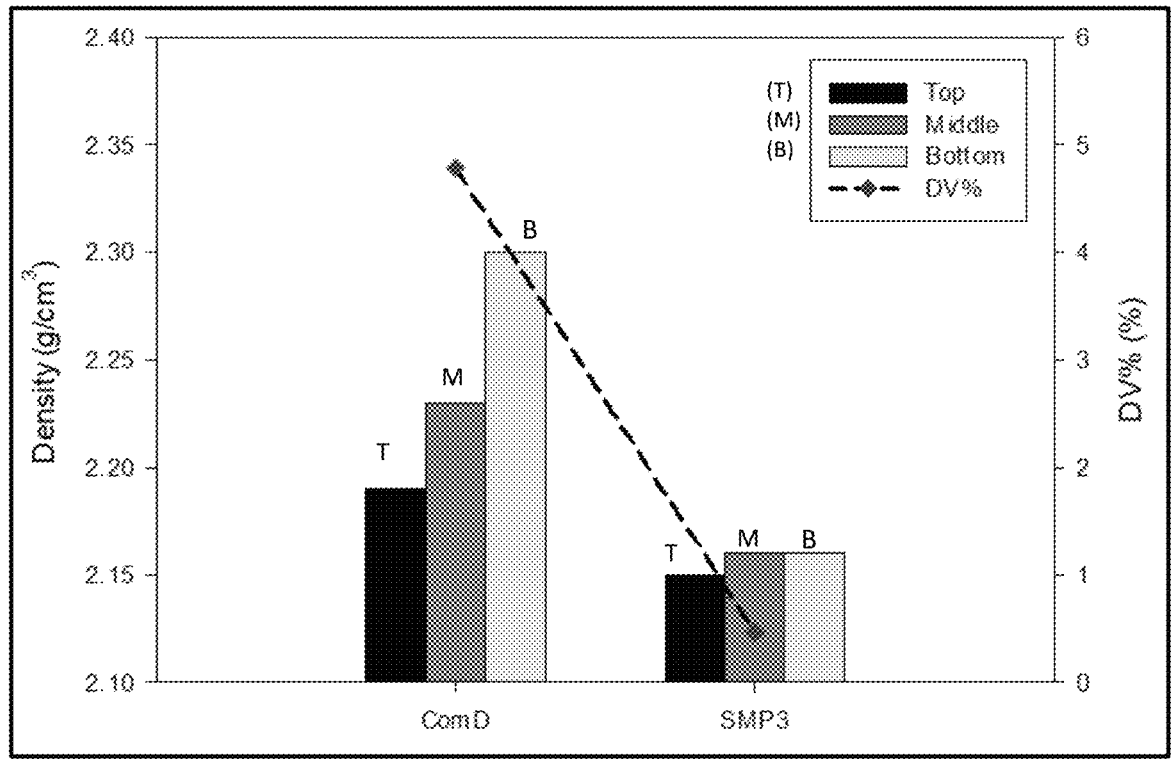
FIG. 6 is a bar graph showing density measurement data collected at the top, middle, and bottom of cured cement samples "ComD" and SMP3, as well as vertical density variation (DV %) of these samples.

In this part of the study, the effect of adding 0.3% BWOC of SMP to class G cement slurry on the slurry properties is compared with a commercially available dispersant (ComD), which is CFR-3® Cement Friction Reducer provided by Halliburton service company. FIG. 6 compares the density variation between the top, middle, and bottom of the samples "ComD" and SMP3 determined using direct density measurement. This figure also compares the density variation percentage (DV %) between top and bottom of all samples calculated using Eq. 1. As indicated in FIG. 6, the densities at bottom and top of sample "ComD" were 2.30 and 2.19 g/cm$^3$, respectively, with 4.78% density variation between the two locations. The densities at bottom, middle, and top of sample SMP3 were 2.16, 2.16, and 2.15 g/cm$^3$, respectively, with variation along the sample length of only 0.46%, which was 90.4% less than the density variation along sample "ComD".

Figure 7A:
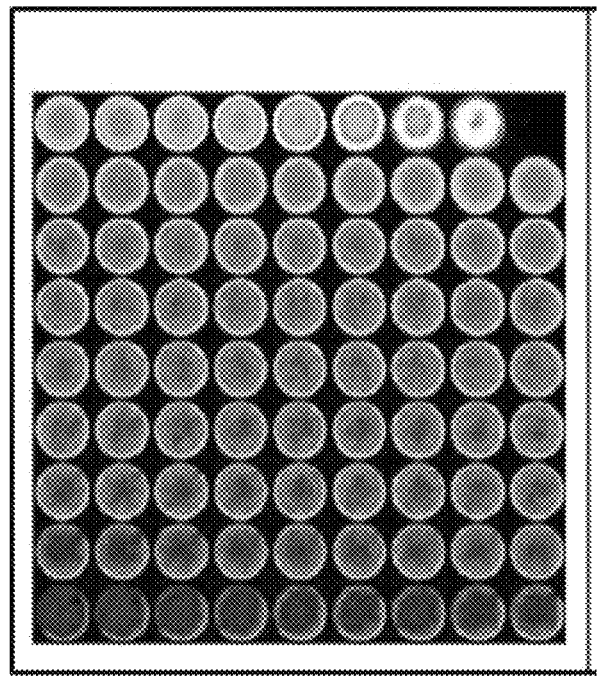
FIG. 7A shows vertical density mapping along the length of a cured cement sample "ComD" measured by CT scan.
Figure 7B:
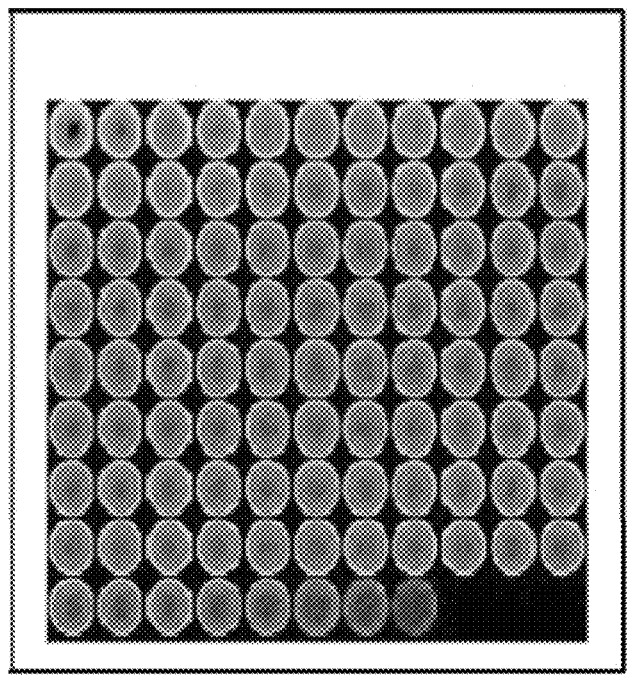
FIG. 7B shows vertical density mapping along the length of a cured cement sample "SMP3" measured by CT scan.

FIGS. 7A and 7B compare the CT scan images for sample "ComD" containing 0.25% BWOC of a commercially available dispersant and sample SMP3 containing 0.3% of SMP, which was confirmed by the previous discussion to be the optimum SMP concentration to improve the cement homogeneity. FIG. 7B indicated that sample SMP3 was more homogeneous in term of density distribution along the sample as demonstrated by the presence of more uniform color (e.g. red) in all the CT images along the sample compared with sample "ComD" in FIG. 7A.

Figure 8:
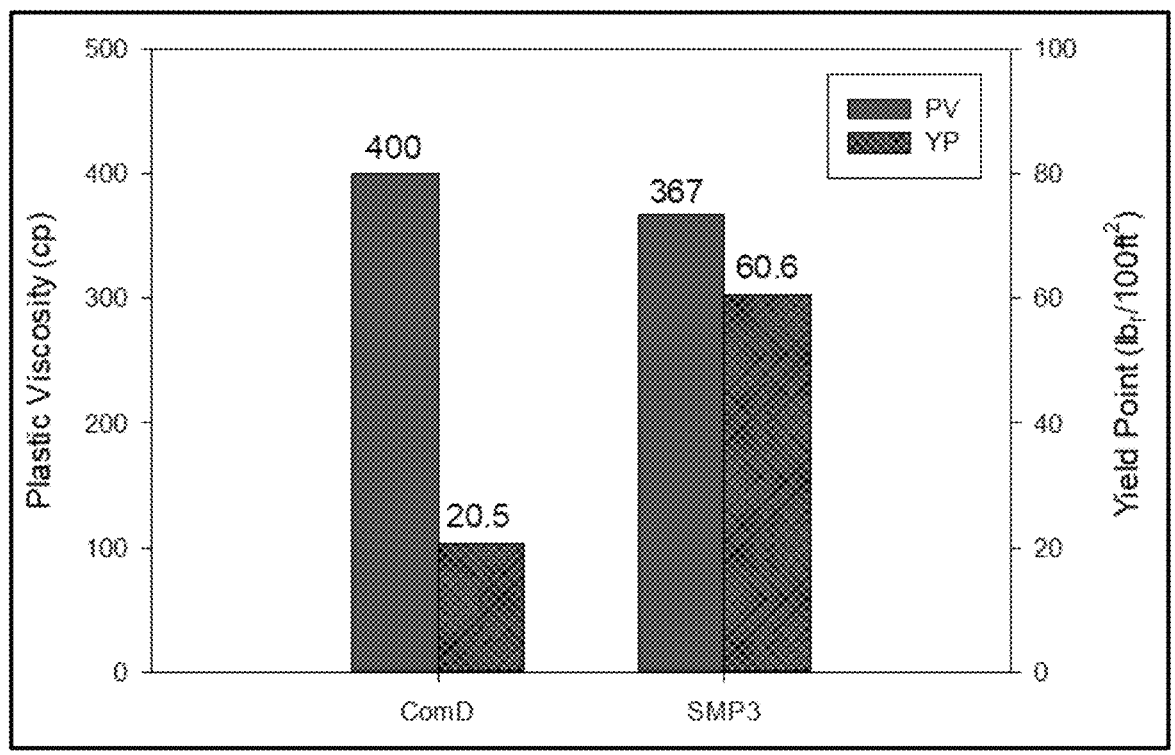
FIG. 8 is a bar graph showing plastic viscosity and yield point of wet cement samples "ComD" and SMP3.

FIG. 8 compares the plastic viscosity and yield point of samples ComD and SMP3. The plastic viscosities of samples ComD and SMP3 were 400 and 367 cp, respectively, which indicated that the plastic viscosity of sample SMP3 was 8.25% less than that of sample ComD. Although the decrease in the plastic viscosity was small, it is enough to ensure an improvement of the injectability of the slurry. The yield point of sample SMP3 was 60.6 lb$_f$/100 ft$^2$, which was 196% greater than the yield point of sample "ComD" (20.5 lb$_f$/100 ft$^2$) as indicated in FIG. 8. The increase in the slurry yield point of sample SMP3 is an essential property that led to improvement in its ability to prevent solids settling.

Figure 9:
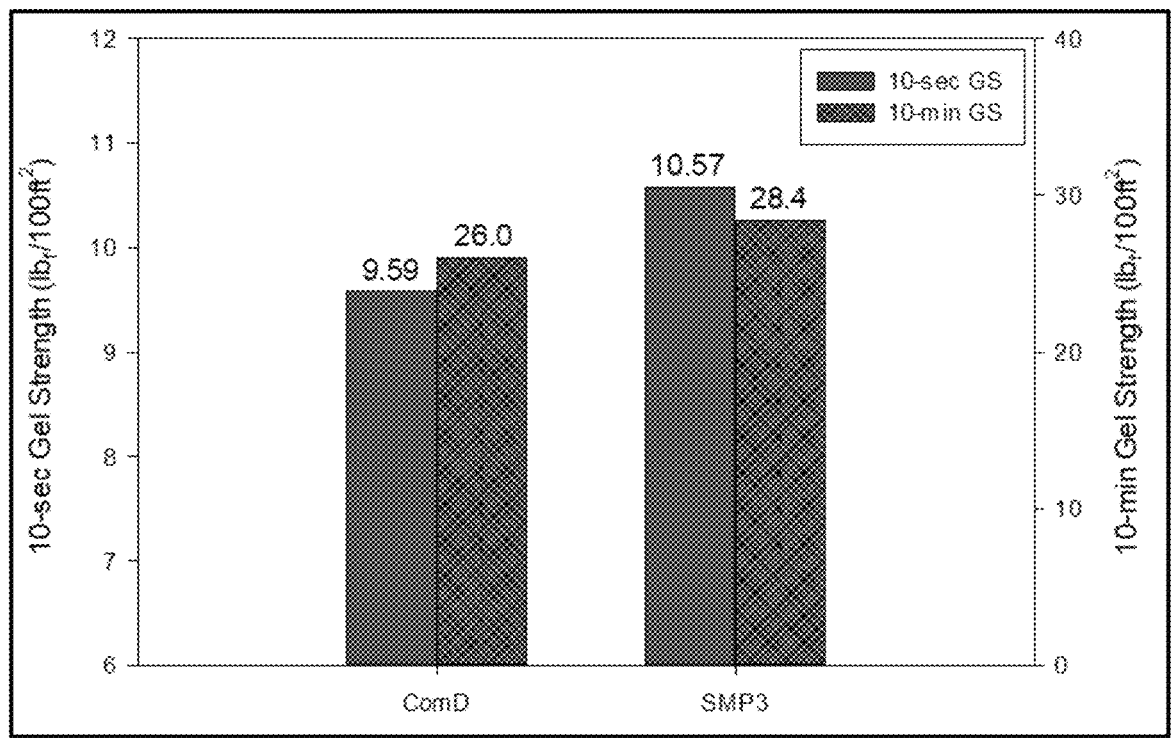
FIG. 9 is a bar graph showing ten-second gel strength and ten-minute gel strength of wet cement samples "ComD" and SMP3.

The 10-sec and 10-min gel strengths of samples ComD and SMP3 are summarized in FIG. 9. Addition of 0.3% of SMP increased the 10-sec and 10-min gel strengths by 0.98 and 2.4 lb$_f$/100 ft$^2$ compared to sample "ComD".

Figure 10:
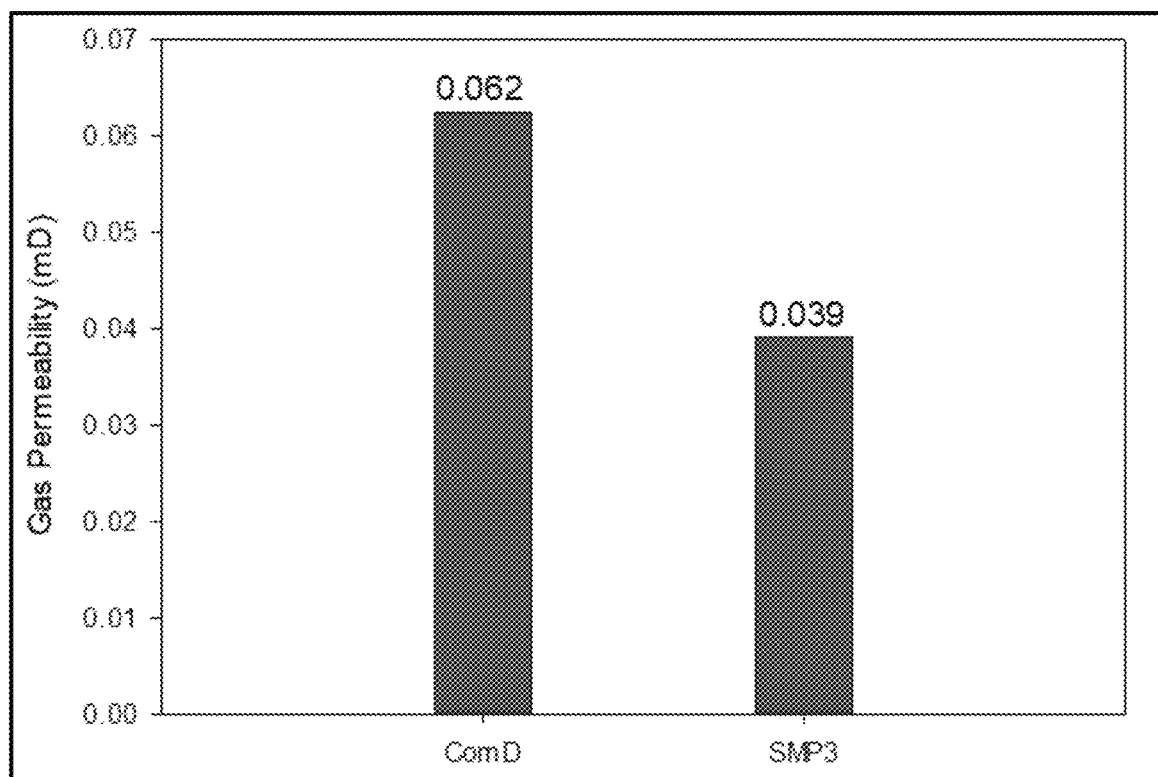
FIG. 10 is a bar graph showing gas permeability of cured cement samples "ComD" and SMP3.

FIG. 10 compares the permeability of samples "ComD" and SMP3. This figure indicates that the permeability of the cement sample prepared with 0.3% of SMP had a permeability of 0.039 mD, which was 37.1% less than the permeability of the sample prepared with the commercial dispersant (0.062 mD).

Figure 11:
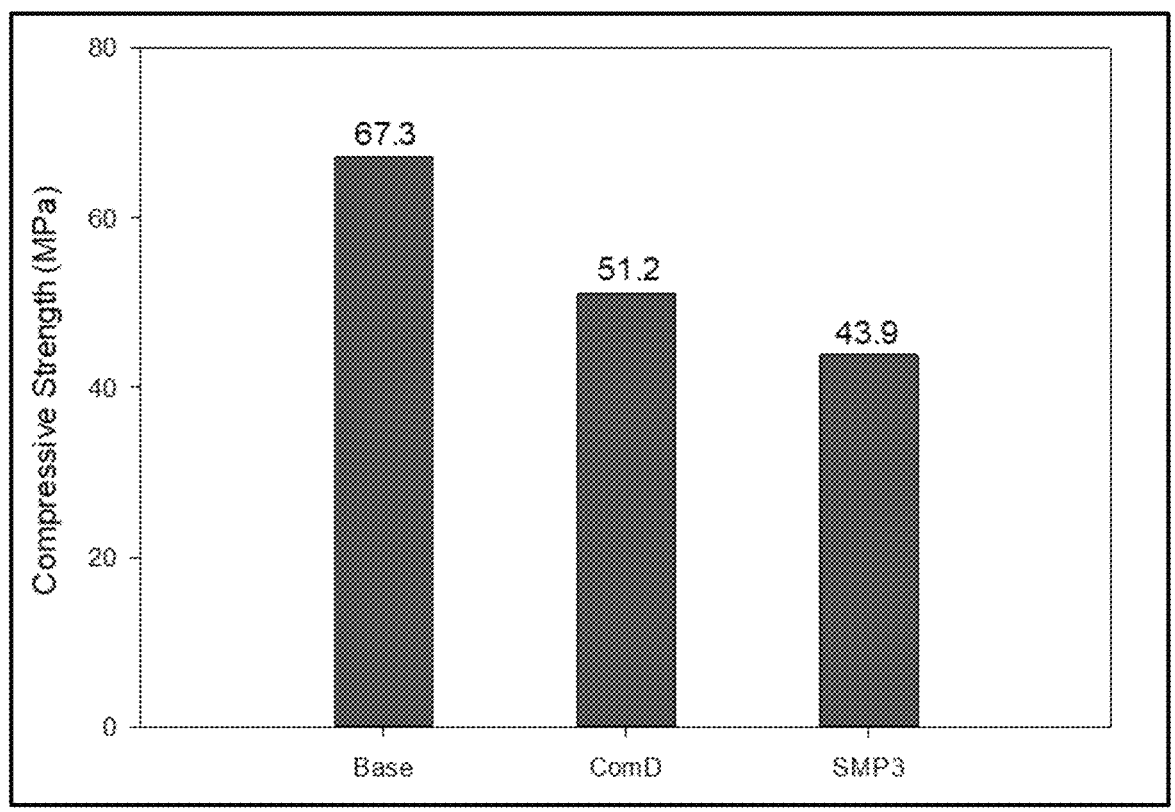
FIG. 11 is a bar graph showing compressive strength of cured cement samples "Base", 'ComD", and SMP3.

FIG. 11 compares the compressive strengths of samples "Base", "ComD", and SMP3. This figure indicates that the compressive strength of the base sample (i.e. sample "Base") was 67.3 MPa. Addition of dispersants reduced the cement compressive strength. Specifically, the compressive strength of the sample with 0.25% of the commercial dispersant (i.e. sample "ComD") was 51.2 MPa, while sample SMP3 has a compressive strength of 43.9 MPa. The strength of sample SMP3 is high enough to ensure a good zonal isolation and wellbore stability.

Example 10

Additional Cost to Prepare the Cement

In this section, the additional cost to prepare one barrel of the new cement with a slurry density of 16 pound per gallon (ppg) is described. The cost of the SMP is $16.8/kg. To prepare one barrel of the slurry with a density of 16 ppg and SMP concentration of 0.3% BWOC, 0.896 kg of the SMP is needed. Accordingly, the additional cost of the new cement is $15/barrel of slurry. Note in this case, the cost of the commercial dispersant used to prepare the slurry must be subtracted from the total cost.

Example 11

In this study, the effect of SMP dispersant on improving class G oil well cement static stability was evaluated and compared with the performance of commercially available dispersant. The effect of different concentrations of SMP on the cement density distribution vertically along the cement column, the rheological characteristics, permeability, and compressive strength of cement were evaluated. 0.3% BWOC of SMP was found to prevent slurry segregation with density variation between the top and bottom of the cement column of 0.46% compared with a density variation of 4.78% for the cement incorporating the commercial dispersant. CT scan imaging further indicated the homogeneous density distribution along the cement column for the samples incorporating 0.3% BWOC of SMP. The plastic viscosity, 10-sec, and 10-min gel strengths of the sample with the commercial dispersant and the sample with 0.3% BWOC of SMP were almost the same. Addition of 0.3% BWOC of SMP has increased the yield point of the cement slurry to 60.6 lb$_f$/100 ft$^2$ compared with 20.5 lb$_f$/100 ft$^2$ for the slurry with 0.25% BWOC of the commercial dispersant. Incorporating 0.3% BWOC of SMP has decreased the permeability by 37.1% compared with the sample containing the commercial dispersant. Addition of SMP and commercial dispersant both decreased the cement compressive strength compared with the cement without dispersant. However, the sample with 0.3% BWOC of SMP had a compressive strength of 43.9 MPa, which is still greater than the minimum acceptable compressive strength required for oil well cement matrix.

In summary, a synthetic modified phyllosilicate based cement formulation that had homogenous vertical density distribution was developed. The notable features of the cement formulation include the following: (1) the cement formulation has little to no solid segregation in vertical wells; (2) the developed cement formulation can be used for cementing oil, gas, and water wells; (3) the developed formulation can be used for cementing vertical, horizontal and multilateral wells; (4) the synthetic modified phyllosilicate can be used at a concentration within a range of 0.1 to 0.5% BWOC with an optimum concentration of 0.3% BWOC for homogeneous density distribution; (5) including 0.3% BWOC of synthetic modified phyllosilicate increased the cement yield point, 10 sec and 10 min gel strength which indicate the equal distribution of cement density; (6) including 0.3% BWOC of synthetic modified phyllosilicate enhanced the cement rheology without affecting the plastic viscosity; (7) including 0.3% BWOC of synthetic modified phyllosilicate decreased the cement permeability by 40% compared with the base cement and by 37.1% compared with the sample containing the commercial dispersant (0.25% BWOC); (8) to prepare one barrel of the slurry with a density of 16 ppg and SMP concentration of 0.3% BWOC, 0.896 kg of the SMP is needed. As the cost of the synthetic modified phyllosilicate (SMP) is $16.8/kg, the additional cost of the new cement is $15/barrel or less of slurry, because the cost of the commercial dispersant used before to prepare the slurry must be subtracted from the total cost suggested; and (10) the developed cement formulation will help in preventing well control problem, hole stability, leaking through the cement, and increasing the service life of the cement.

The invention claimed is:

1. A cement composition, comprising:
a hydraulic cement;
silica flour;
a defoamer:
an expandable agent;
a fluid loss controller; and
from 0.1 to 0.5 wt % (BWOC) of a synthetic phyllosilicate comprising $SiO_2$, MgO, and $Li_2O$,
wherein:
a weight ratio of the hydraulic cement to the synthetic phyllosilicate is from 200:1 to 1,000:1,
a combined weight of $SiO_2$ and MgO is 80-95 wt % of a total weight of the synthetic phyllosilicate; and
the synthetic phyllosilicate has a weight ratio of $SiO_2$ to MgO in a range of 3:2 to 7:2.

2. The cement composition of claim 1, wherein the synthetic phyllosilicate further comprises $Na_2O$.

3. The cement composition of claim 1, wherein the synthetic phyllosilicate is in the form of spherical particles with an average particle size of 10-100 nm, and a BET surface area of 300-1,000 $m^2$/g.

4. The cement composition of claim 1, wherein the synthetic phyllosilicate has a bulk density of 800-1,200 kg/$m^3$.

5. The cement composition of claim 1, wherein the synthetic phyllosilicate comprises a hectorite clay.

6. The cement composition of claim 1, wherein a weight ratio of the hydraulic cement to the silica flour is in a range of 2:1 to 5:1.

7. The cement composition of claim 1, wherein the hydraulic cement is selected from the group consisting of an API Class A Portland cement, an API Class G Portland cement, an API Class H Portland cement, and a Saudi Class G hydraulic cement.

8. A wet cement slurry, comprising:
the cement composition of claim 1; and
water in an amount of 40-50% by weight of the hydraulic cement.

9. The wet cement slurry of claim 8, which has a plastic viscosity in a range of 320-380 cP.

10. The wet cement slurry of claim 8, which has a yield point of 50-70 $lb_f$/100 $ft^2$.

11. The wet cement slurry of claim 8, which has a ten-second gel strength of 9.8-14 $lb_f$/100 $ft^2$, and a ten-minute gel strength of 26-32 $lb_f$/100 $ft^2$.

12. A method of cementing a portion of a wellbore, the method comprising:
introducing the wet cement slurry of claim 8, into the portion of the wellbore; and
allowing the wet cement slurry to cure thereby forming a wellbore cement.

13. The method of claim 12, wherein the wellbore has a temperature in a range of 70-300° C., and a pressure of 1-40 MPa.

14. The method of claim 12, wherein the wellbore is at least one selected from the group consisting of a horizontal wellbore, a vertical wellbore, and a multi-lateral wellbore.

15. The method of claim 13, wherein the wellbore cement has a compressive strength of 40-55 MPa.

16. The method of claim 13, wherein the wellbore cement has a gas permeability of 0.03-0.045 millidarcy (mD).

* * * * *